United States Patent
Fernandez et al.

[11] Patent Number: 6,135,606
[45] Date of Patent: Oct. 24, 2000

[54] COMBINED DANCING LIGHT LOLLYPOP-PACIFIER HOLDER

[76] Inventors: Rodolfo Fernandez; Blas Castor Perez, both of 115 E. Gold St., Kings Mountain, N.C. 28086

[21] Appl. No.: 09/361,344

[22] Filed: Jul. 26, 1999

[51] Int. Cl.[7] ........................................................ F21V 33/00
[52] U.S. Cl. ............................................ 362/109; 362/253
[58] Field of Search ................................... 362/109, 253, 362/186, 565, 572, 574; 446/219, 227

[56] References Cited

U.S. PATENT DOCUMENTS

| | | | |
|---|---|---|---|
| 4,290,095 | 9/1981 | Schmidt | 362/191 |
| 4,914,748 | 4/1990 | Schlotter | 362/109 |
| 5,471,373 | 11/1995 | Coleman | 362/109 |

*Primary Examiner*—Sandra O'Shea
*Assistant Examiner*—Hargobind S. Sawhney

[57] ABSTRACT

The present invention is a hand held toy to hold translucent Lollypops or other similar sucker candies producing illumination from the interior of the candy in such a way that tiny light spots blink varying in color and position, to increase children amuse while using the holder with the candy. It has a battery powered light emitting source controlled by a sensible pushbutton switch, and is securely and hermetically assembled and made of smooth surface finishing rounded shaped and resistant parts being completely washable to guarantee its hygienic and safe use by little children. It can be provided with a protecting cover to keep the candy from dust, insects and microbes. It can be provided with small transparent or colored lenses above the light emitting source, so that small colored light beams are projected upwards toward the lower surface of the translucent colored sucker candy attached to the holder, producing an attractive glowing effect and improving the user's amusement. Alternatively, it can be transformed into a blinking varying color spot lighted pacifier attaching to it a pacifier cap. It also can be used as a baby entertaining toy hanging it in any safe place of the cradle. The toy can be designed in different shapes and colors, so as the candies, which can have a wide variety of flavors, colors and shapes, such as balls, discs, stars, polygons, clown heads, flowers, etc. In addition, as many other similar toys, it can be provided with sound, rotation and vibration motions, etc., by adding the appropriate devices or mechanisms. This type of toy can be useful to administer to little children certain medicines which can be candy like produced. In one of its possible embodiments it could also be used as a little pocket flashlight. The whole set can be kept in a especially decorated plastic case.

5 Claims, 4 Drawing Sheets

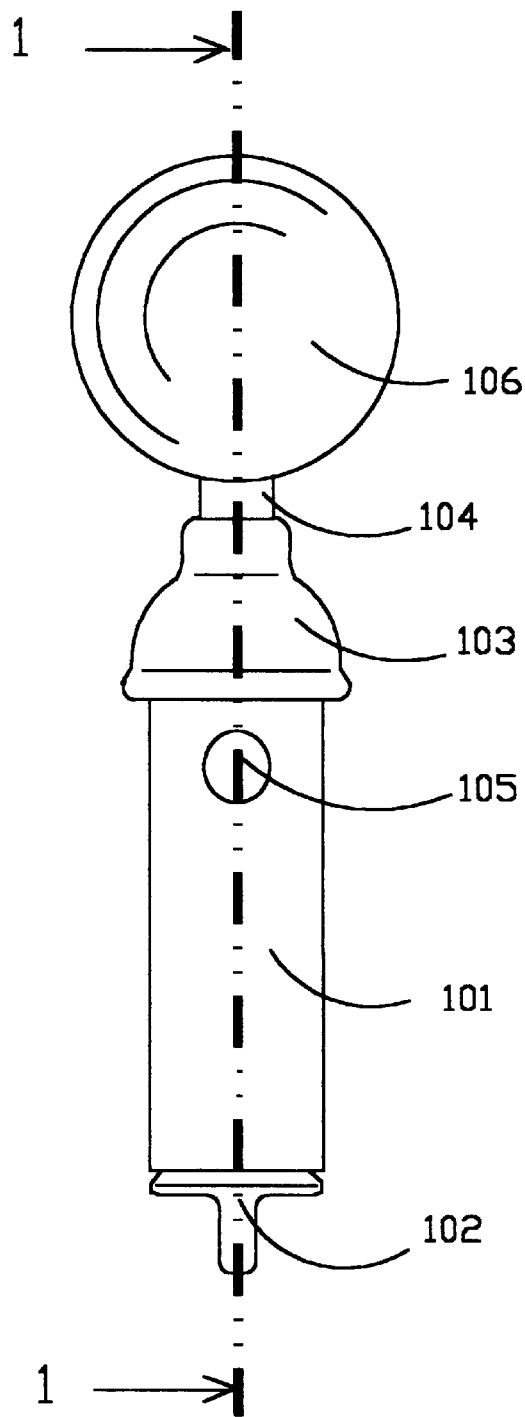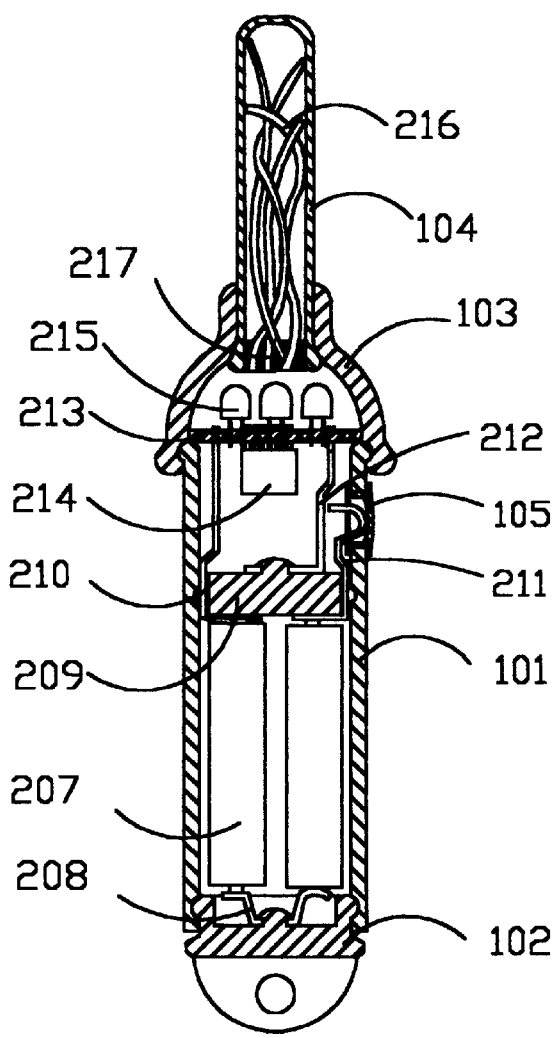

COMBINED DANCING LIGHT LOLLYPOP-PACIFIER HOLDER

BACKGROUND OF THE INVENTION

In the past a great variety of toys and devices to hold sucker candies, and to hold baby pacifiers, has been developed, each providing different ways of amusement based on light emission, sounds, motions and configurations, or combining two or more of those features, as the inventions and designs of reference.

However, some or them do not allow a thorough washing of the reusable toy, others are not safe enough to be handled by little children, and none of them make use of the advantages of fiber-optics or introduce the light emission source inside de candies, what would improve its amusing effect.

BRIEF SUMMARY OF THE INVENTION

The present invention relates to a Lollypop and similar sucker candies holding toy, which can be alternatively used as a pacifier holder, provided with one or more electric batteries as energy supply for a controlled light source which produces blinking tiny light spots varying in color and position from the interior of the translucent candy, by means of several fiber-optics elements, or L.E.D.s or miniature light bulbs, introduced inside a tubular transparent stem to which the candy is securely fixed in a proper way. These tiny blinking light spots varying in color inside the candy, add fun to the action of eating such candies in an unusual way, which constitutes the main novelty feature of the present invention.

Another feature of this toy is that to it can be attached a translucent pacifier cap which can be used by babies with the improved entertaining affect of the blinking colored lights inside the pacifier.

Further more, this invention gives special attention to the safety and hygienic aspects of the toy intended for little children not only providing an engineered design which make unlikely its accidental and dangerous breaking or disassembling, but also making very easy to wash it as thoroughly as required and, in addition, provides a comprehensive integrated system including a protecting cover to keep the candy or the pacifier or the holding stem from dust, insects and microbes, while it is not being used to suck a candy or a pacifier.

The light effect is provided by the combined action of one or more L.E.D.s of varying color of the intermittent emission type and/or a control I.C. chip, energized by an electric battery source which, in turn, is controlled through a sensible pushbutton switch conveniently located in the main body of the hand held toy.

Obviously, this toy could also be used as a little pocket flashlight.

When the protecting cover or the pacifier cap are engaged to the toy, they can moved, if so desired, to a position in which the switch stays depressed to keep the toy in continuous operation any time within the batteries life.

Some other design and advantageous features of the present invention will become evident through the following description analyzing the illustrating drawings.

BRIEF DESCRIPTION OF THE DRAWINGS

FIG. 1 is a side-elevation outer view of a possible embodiment for the Combined Lollypop-pacifier Dancing Light Holder;

FIG. 2 is an axial sectional view of the toy along line 1—1 in FIG. 1, showing one possible internal composition.

DESCRIPTION OF THE PREFERRED EMBODIMENT

Figure 3:
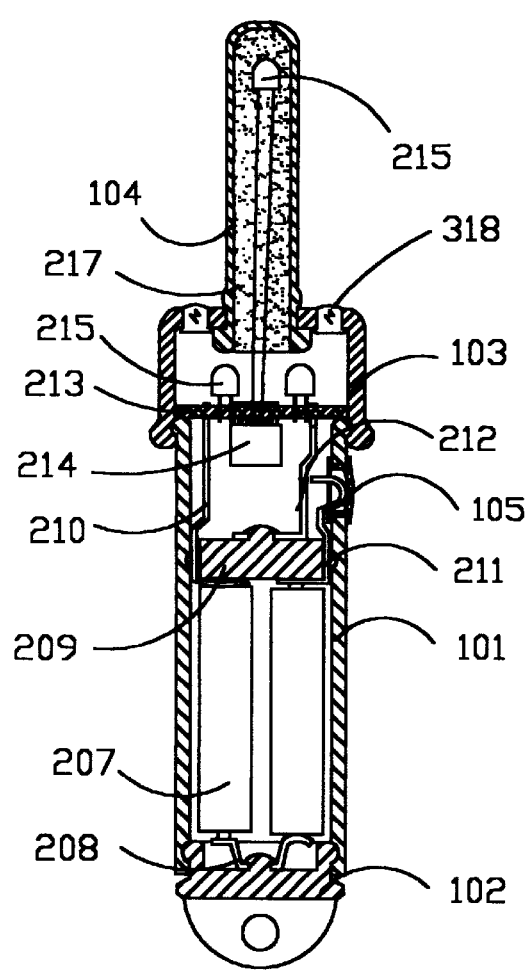
FIG. 3 is the same view of FIG. 2, but illustrating some possible variations consisting of the direct introduction of the light emitting elements inside the candy holding part and the addition of small lenses to illuminate the candy from below.

The drawings illustrate a combined blinking light toy intended primarily to hold translucent sucker candies which are illuminated from inside by color and position varying blinking tiny light spots, including, basically, a battery powered light source which can be controlled through an integrated circuit, properly fixed and connected to a suitable small printed circuit board, and a sensible switch, to provide flashing variations in color, transmitting the light through several fiber-optics elements introduced inside a transparent tubular stem like candy holder, or locating L.E.D.s or miniature light bulbs directly inside it, and producing an amusing effect to the user. The candies to be attached to this holding device must be translucent and provided with a hole to fit it to the holder, and both, the stem and the candy hole must be designed to assure a secure grab between them.

The holding stem of the toy could be designed to make it dispensable providing it with a threaded or any other type of fitting solution easy to remove by an adult. It also could be integrated in one only piece with the upper cover.

Although the figures illustrate a cylindrical shaped holding stem, it could be tapered like the Morse taper used in machinery to hold tools such as drills, etc. It also could be threaded or could have any other suitable shape to comply its holding purpose. The sucker candies in turn, can have a wide variety of shapes such as spheres, discs, stars, polygons, hearts, flowers, clown heads, etc.

It can be provided with little transparent or colored lenses above the light emitting source, so that small colored light beams are projected upwards toward the lower surface of the translucent colored sucker candy attached to the holder, or the upper cover above the light emitting source could be translucent or transparent, producing an attractive glowing effect improving the user's amusement.

This toy could be advantageously used not just as an entertainment for little children while sucking sweet candies, but also to make easier for parents to induce their children to suck some medicated candies which could be produced especially shaped to fit on this holder.

Another feature of the present invention, as illustrated below, is that it can be used as a colored blinking lights baby pacifier holder, attaching an elastic translucent pacifier on its holding stem. Either the holding stem could be designed to fit the existing pacifiers, or new pacifier models could be produced to fit to this holder.

Furthermore, the toy object of the present invention can also be used to entertain little babies hanging it somewhere on the cradle.

Evidently it also could be used as a little pocket flashlight.

Its design and construction features the strength and safety required and allows to wash it properly for hygienic purposes and it includes a cover to protect it against dust, insects and microbes.

It is obvious that the "Combined Dancing Light Lollypop-Pacifier Holder" object of the present invention, can also be provided with sound, rotating and vibrating motion effects, etc., either modifying some of its parts or adding suitable components, which would be energized by the same battery powered source.

It is also evident that the present device, so as the sucker candies and pacifiers, can be designed in a wide variety of shapes, colors, and flavors (in the case of the candies), and that it can be supplied as a whole set in an adequate and attractively decorated case, to keep the set safe and clean.

FIG. 1 shows an external side general view of the device including: a hollow main body 101 to be held in the hand by the user, which can be made of plastic in a variety of shapes and colors, and inside which are housed one or more small batteries not shown in this figure. In the bottom of the main body 101, closing it, securely and water tight is inserted a cap 102.

This cap can be removed to change the batteries. It can be provided with a hole to pass a safety cord to hang or to hold the toy.

On the upper end of the main body 101 is securely and water tight engaged the upper cover 103 which can be either opaque, translucent or transparent. This cover can be removed to check or replace the L.E.D.s or the I.C. chip allocated under it and not shown in this figure. In addition, it can be provided with an outer thread to fit to it a conventional baby drinking bottle suck nipple holding cap, to use the toy as a blinking color lights baby pacifier holder although it can be provided with baby pacifiers specially designed for this purpose.

On the upper central opening of the cover 103, is securely and water tight inserted the transparent holding stem 104, to which is shown securely attached a translucent round sucker candy 106, which also can be manufactured in a great variety of shapes, sizes, colors and flavors, even as medicated candies.

The upper cover 103 can be made of transparent or translucent material, but if it is made of opaque material, it can be provided with small transparent or colored lenses distributed on its upper surface around the base of the holding stem 104 and above the light emitting source, so that small colored light beams are projected upward toward the lower surface of the translucent colored sucker candy attached to the holding stem 104, hence, whatever the type of material used for the upper cover 103, the toy will produce an attractive glowing effect on the candy improving the user's amusement.

A sensible suitable electric switch 105 is conveniently encased in the main body 101, to be easily actuated by the user to operate the holder.

It is obvious that the upper cover 103 and the transparent tubular stem 104 can be integrated to form one only piece depending upon the manufacturing process.

All these parts are made of safe and resistant materials, are securely and hermetically assembled and all their outer surfaces are smooth and rounded to guarantee the safety and hygienic features of the holder object of the present invention. A wide range of suitable fastening systems can be applied to assemble the different parts of this toy. One of the simplest types are the pressure fits illustrated in the included drawings.

FIG. 2 illustrates a general axial section view along line 1—1 in FIG. 1 showing the elements contained inside the toy object of the present invention according to one of its possible embodiments:

Inside the main body 101, are housed one or more small conventional batteries 207 of suitable type and capacity.

For the lower connection of the batteries and to press them upward, an elastic bent laminated metallic electric contact 208 is attached to the cap 102, which is securely and water tight inserted to the lower end of the hollow main body 101. If more than one battery are used, this cap 102 and the elastic electric contact 208 are configured in such a way that they can be inserted in one only position to assure the proper connection of the batteries.

Inside the hollow main body 101, above the battery or batteries 207, fixed in a proper position, is the top contact support plug 209, to which are fixed three separated bent elastic laminated metal contacts conveniently conformed: the permanently closed contact 210, the flexible movable normally open switch contact 211, and the stationary rigid normally open switch contact 212, this latter on the upper surface of the top contact support plug 209, which is conveniently shaped to fit into the hollow main body 101, in a fixed predetermined position.

The flexible movable contact 211 has a curved bend that protrudes freely through a small hole in the side wall of the main body 101, near its upper end, and is covered by an elastic plastic or rubber cap, which constitutes the outer visible part of the electric pushbutton switch 105, and is configured to be securely and hermetically inserted in the main body wall hole. The lower end of the movable contact 211 is permanently pressed against one of the battery electrodes, and its upper end is almost touching the stationary rigid metal contact 212 leaving a very small air gap between both contacts, and keeping the electric circuit normally open To the upper ends of both contacts 211 and 212 is fixed and electrically connected a suitable small printed circuit board 213, to which in turn, are properly connected an adequate Integrated Circuit chip 214 and one or more colored L.E.D.s or miniature light bulbs 215. The electric circuit is closed when the user depresses the pushbutton 105 closing the air gap between the rigid contact 212 and the upper end of the elastic flexible contact 211, which lower end, in turn, is permanently pressed against the second battery electrode.

The printed circuit board 213, the I.C. chip 214 and the L.E.D.s 215, are housed in a small chamber formed above the contact supporting plug 209, inside the upper section of the main body 101, and covered by the upper cover 103, which is securely and water tight engaged to the upper edge of the main body 101. This upper cover 103 has a central opening on its top and can be made of translucent or opaque plastic in different shapes, among which could be included an outer thread to attach a conventional baby drinking bottle nipple holding cap, etc.

In the top opening of the cover 103 is securely and hermetically inserted the holding stem 104, made of transparent flexible and resistant plastic material which has a tubular shape with its top closed and open in its lower end or base.

However, as said above when describing FIG. 1, it is obvious that the upper cover 103 and the transparent tubular stem 104 can be integrated to form one only piece just depending upon the manufacturing process.

Inside the holding stem 104 are introduced several fiber-optics elements 216 in such a way, that their lower ends point to the L.E.D.s 215 and their upper ends spread along and around the inner surface of the holding stem 104 pointing out in random distribution.

The lower open end at the base of the holding stem 103 is closed with a resin made plug 217, which at the same time holds in position the fiber optics elements 216.

On the holding stem can be securely fitted translucent suck candies of different shapes, colors and flavors, as previously shown in FIG. 1, position 106, so as different designs of baby pacifiers, as shown in other figure below.

The upper cover 103, as described above, can be made of transparent or translucent material, but it can also be opaque and in this case, can be provided with small transparent or colored lenses distributed on its upper surface around de base of the holding stem 104 and above the light emitting source, so that small colored light beams are projected upwards toward the lower surface of the translucent colored sucker candy attached to the holding stem, producing an attractive glowing effect improving the user's amusement whatever the case.

When the user depresses the pushbutton 105, its flexible movable contact 211 is pressed against the stationary rigid contact 212, closing the air gap between both contacts and connecting the circuit so that the electric energy from the batteries circulates through the printed circuit board 213 to the input circuit of the I.C. chip 213, activating through its output circuit one or more L.E.D.s 215, which are permanently connected to the output terminals of the I.C. chip 214 through the printed circuit board 213. This electric circuit and a simplified one are schematically shown in other figures.

FIG. 3 is a view similar to FIG. 2 but illustrating some possible modifications such as the following ones: the upper cover 103 has a different configuration with a flat top, in which, in addition to the central opening, there are several small holes evenly distributed around the central opening and into them, little colored plastic lenses 318 are inserted and hermetically fixed by proper means; the tubular transparent holding stem 104 has its open lower end provided with an outer locking round circular edge to keep it firmly fixed in the upper cover 103 central opening and inside it is shown directly introduced one L.E.D. or miniature light bulb 215, although obviously could be introduced two or more of them. The empty space inside the tubular holding stem 103 is shown filled with an appropriate transparent resin 217, but such filling is optional.

When a candy, not shown in this figure, is attached to the holding stem 104, the light from the light emitters 215 inside the upper cover 103, goes out through the little lenses 318 in the form of narrow color light beams illuminating the candy and producing an attractive colored glowing on its surface, improving the amusement effect of the toy.

Figure 4:
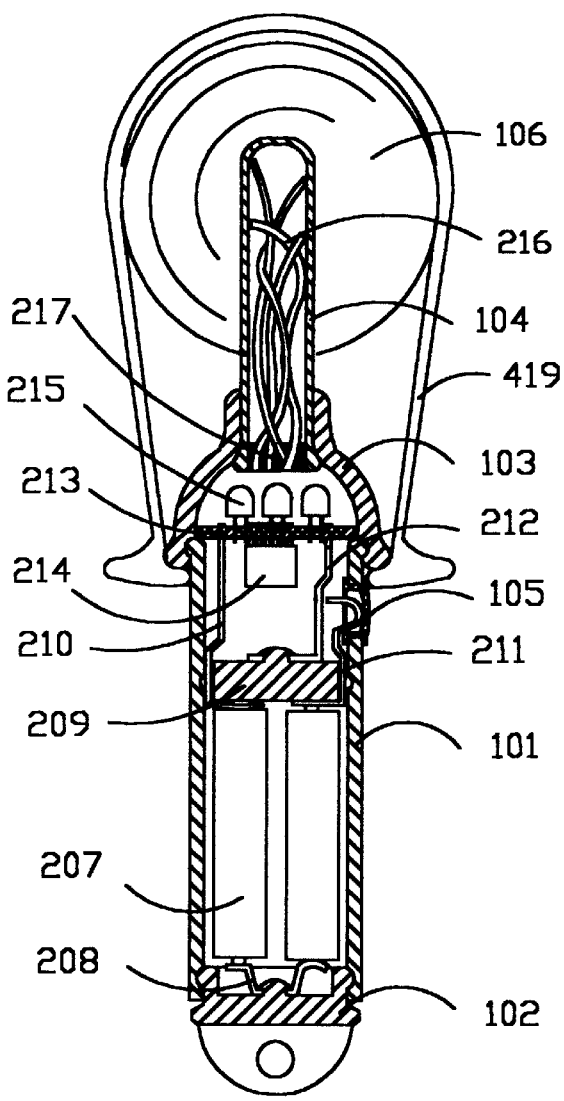
FIG. 4 is the same view of FIG.2, but including a rounded sucker candy and a protecting cover attached to the holder.

FIG. 4 is a view similar to FIG. 2 but showing in section a typical sucker candy 106 fixed to the holding stem 104, and covered with a protecting cover 419, wrapped around the candy and the upper cover 103, to keep them from dirty and contamination while the toy is not in use.

The lower edge of the protecting cover 419 can be moved to a position where it depresses the pushbutton switch 105, activating the blinking colored lights to use it as an entertaining toy for little children during any wished time within the battery life.

Figure 5:
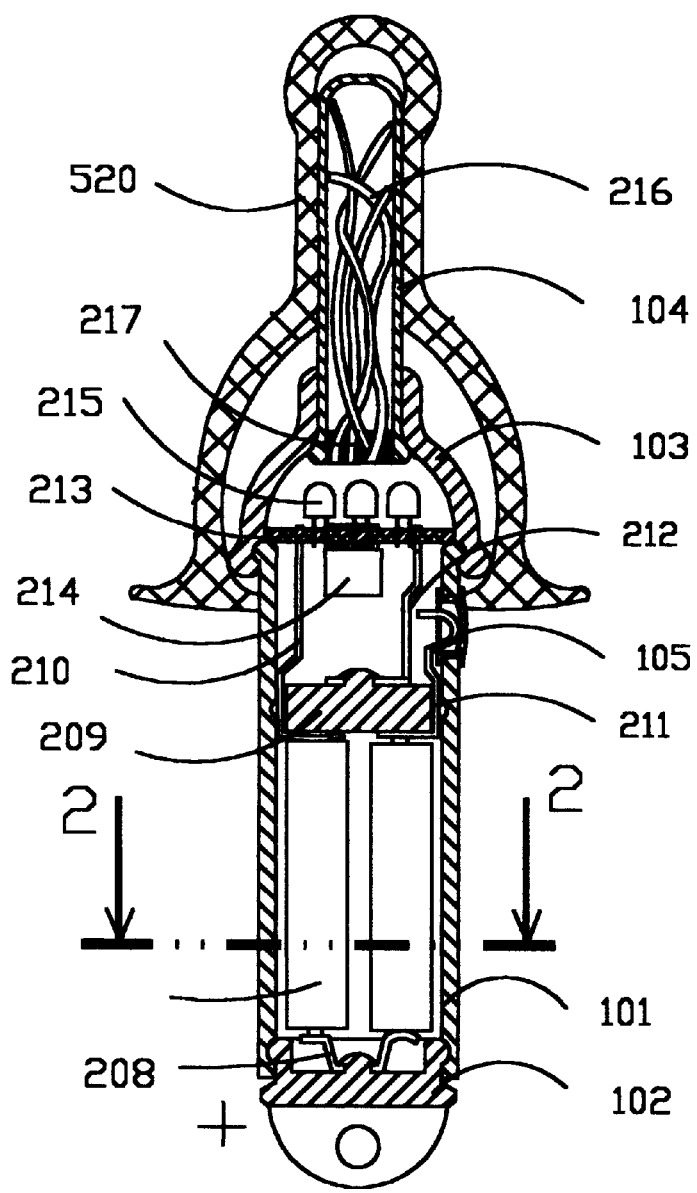
FIG. 5 is the same view of FIG. 2 but showing a pacifier cap attached to the holder.

FIG. 5 is a view similar to FIG. 2 illustrating a possible assembly of a baby pacifier cap 520, made of translucent elastic baby safe material, to use the toy as an entertaining blinking lights pacifier holder. The lights can be switched on moving the pacifier cap to a position in which its lower edge depresses the pushbutton.

The toy can be designed to be compatible either with commercially available baby pacifiers or with pacifiers especially designed for this holder.

In addition, this "Combined Dancing Light Lollypop-Pacifier Holder" can be provided with an elastic ring, not shown in the figures, that can be used to hold the pushbutton switch in its depressed position, so that it can stay activated continuously for the time wished within the battery life.

Figure 6:
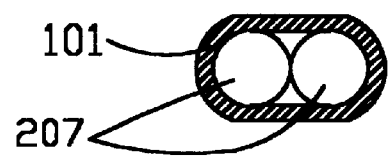
FIG. 6 is a cross sectional view of the holder along line 2—2 in FIG. 5 showing two batteries encased inside its main body .

FIG. 6 is a cross section view along line 2—2 in FIG. 5 of the main body 101 of the "Combined Dancing Light Lollypop-Pacifier Holder" with a possible shape to house two AAA batteries 207.

Figure 7:
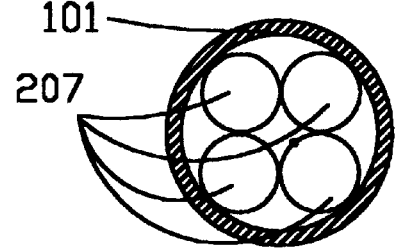
FIG. 7 is a cross sectional view of the holder along line 2—2 in FIG. 5 showing four batteries encased inside its main body.

FIG. 7 is a cross section view along line 2—2 in FIG. 5 of the main body 101 of the "Combined Dancing Light Lollypop-Pacifier Holder" with a possible shape to house one AAA battery 207.

Figure 8:
FIG. 8 is a cross sectional view of the holder along line 2—2 in FIG. 5 showing one battery encased inside its main body.

FIG. 8 is a cross section view along line 2—2 in FIG. 5 of the main body 101 of the "Combined Dancing Light Lollypop-Pacifier Holder" with a possible shape to house four AAA batteries 207.

Figure 9:
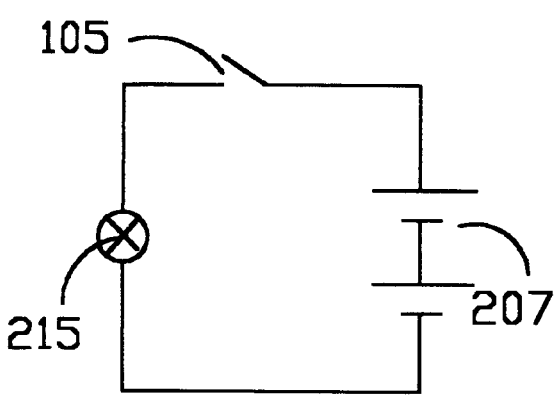
FIG. 9 is an schematic electric circuit of the toy showing a simplified L.E.D.-switch-battery circuit.

FIG. 9 shows a possible simplified electric circuit for the holder object of the present invention reduced to: battery energy supply 207; light emission source 215 and switch 105.

Figure 10:
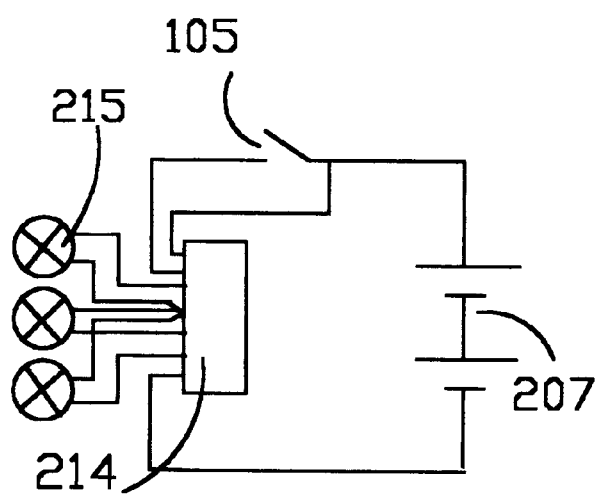
FIG. 10 is an schematic electric circuit of the toy showing a L.L.D.-I.C.-switch-battery circuit.

FIG. 10 shows another possible electric circuit for the present invention comprising: battery energy supply 207; integrated circuit chip 214, light emission source 215 and switch 105.

Figure 11:
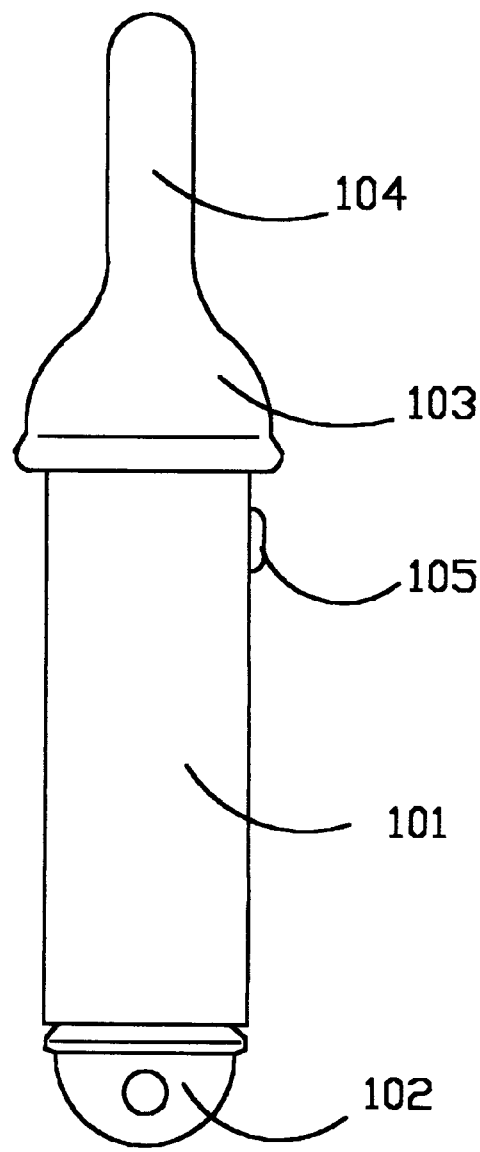
FIG. 11 is a general exterior view of the toy showing a possible simplified construction.

FIG. 11 is an external view of the toy, illustrating a possible simplified design in which the upper cover 103 instead of a flat or convex top with a center opening, is closed and configured to integrate the tubular holding stem 104 in ne piece with the upper cover 103.

The improvements and novelty features of the present invention are basically the use of L.E.D.s or miniature light bulbs optionally combined with fiber-optics elements to emit blinking colored tiny light spots varying in color and position from the inside of translucent sucker candies and, alternatively, from inside of a baby pacifier with improved entertaining effect. Another feature is its secure and water-tight assembly turning it into a safe and easy to wash toy being provided with different elements to guarantee the safety and hygienic requirements for the little children to whom the toy is intended.

The authors built a simple home made prototype of the invention by their own means which was satisfactorily tested.

The description above makes possible for anybody skilled in this field to manufacture the object of the present invention, which main non standard parts can be produced in large scale at relatively low costs, since they are mainly plastic components which can be massively produced by plastic injection using not very complex injection moulds. Other parts are small conformed metallic pieces which can be massively produced by die forming processes using not very expensive small presses and not very complex dies. The standard parts are commonly available at relatively low prices due to their small size and their actual very large market as is the case of the microchips, L.E.D.s, batteries and fiber-optics elements. The final assembling or the holder object of this invention can be easily hand made without the need of highly qualified laborers or expensive tooling, although it would be possible its automation depending upon the scale of production.

What we claim as our invention is:

1. A combined holding toy to suck candies or baby pacifiers including an electrical energy battery source housed inside a hollow hand held main body, a light emitting source housed inside an upper chamber covered by an upper cover, a connecting-supporting electrical printed circuit, a transparent tubular holding stem, with fiber-optics elements introduced into said tubular stem, and an electric control properly located on the main body, to connect and control the electrical battery source, the electric circuit and the light emitting source to produce blinking tiny lights varying in color which are conducted through the fiber-optics elements to different spots inside the transparent tubular holding stem securely and conveniently engaging a translucent sucker candy of any color, shape and flavor in such a way that the user is amused seeing tiny light spots blinking inside the candy in different colors and positions or in which the light emitting source or part of it consisting of one or more L.E.D.s or miniature light bulbs, introduced inside the tubular transparent holding stem emit the blinking colored light directly from inside the colored translucent candy attached to the holder.

2. A combined holding toy to suck candies or baby pacifiers as described in claim 1, in which its upper cover above the light emitting source is transparent or translucent or provided with several small holes evenly distributed on the cover top, closed by little plastic lenses, emitting color light beams illuminating the outer surface of the candy attached over the toy when it is in use, making the candy to glow in an attractive way and so improving its amusing effect.

3. A combined holding toy to suck candies or baby pacifiers as described in claim 1 to which is attached a translucent baby pacifier of different colors and designs, wrapped over its holding stem and upper cover in such a way that it can be moved to a position where it switches on the light emitting source and the baby user, when looking to the toy, is amused seeing tiny light spots blinking and changing in color and position through the translucent pacifier.

4. A combined holding toy to suck candies or baby pacifiers as described in claim 1 which is totally enclosed and water tight assembled allowing to wash it thoroughly under a water stream to guarantee the required hygienic condition to be reused many times.

5. A combined holding toy to suck candies or baby pacifiers as described in claim 1 which provided with a protecting cover to keep it from dust, insect and microbes, and said protecting cover is moved to a position where it switches on the light emitting source to keep the toy operating for any desired time within the battery life so that it can be used as an entertaining color blinking tiny lights toy for little children when it is not in use to suck sweet candies or baby pacifiers.

\* \* \* \* \*